United States Patent
Hong et al.

(10) Patent No.: US 10,090,501 B2
(45) Date of Patent: Oct. 2, 2018

(54) HIGH HEAT RESISTANCE COMPOSITE SEPARATOR FOR LITHIUM SECONDARY BATTERY AND LITHIUM SECONDARY BATTERY INCLUDING SAME

(75) Inventors: Ji-Jun Hong, Seoul (KR); Sung-Tae Ko, Chungcheongnam-do (KR); Yoon-Jeong Heo, Chungcheongnam-do (KR); Yoo-Jung Kwon, Daejeon (KR)

(73) Assignee: Kokam Co., Ltd., Siheung-si, Geyonggi-do (KR)

( * ) Notice: Subject to any disclaimer, the term of this patent is extended or adjusted under 35 U.S.C. 154(b) by 187 days.

(21) Appl. No.: 14/364,415

(22) PCT Filed: Feb. 13, 2012

(86) PCT No.: PCT/KR2012/001052
§ 371 (c)(1),
(2), (4) Date: Aug. 26, 2014

(87) PCT Pub. No.: WO2013/089313
PCT Pub. Date: Jun. 20, 2013

(65) Prior Publication Data
US 2014/0370358 A1    Dec. 18, 2014

(30) Foreign Application Priority Data
Dec. 13, 2011 (KR) .......................... 10-2011-0133354

(51) Int. Cl.
*H01M 2/16* (2006.01)
*H01M 10/052* (2010.01)
*H01M 10/42* (2006.01)

(52) U.S. Cl.
CPC ......... *H01M 2/1686* (2013.01); *H01M 2/162* (2013.01); *H01M 2/166* (2013.01);
(Continued)

(58) Field of Classification Search
CPC .......... H01M 10/052; H01M 10/4235; H01M 2/162; H01M 2/1646; H01M 2/1653;
(Continued)

(56) References Cited

U.S. PATENT DOCUMENTS

| 2005/0031937 A1* | 2/2005 | Akashi | ................ H01M 2/0275 429/62 |
| 2006/0008700 A1* | 1/2006 | Yong | ................... H01M 2/1653 429/144 |

(Continued)

FOREIGN PATENT DOCUMENTS

| JP | 2007-324073 A | 12/2007 |
| JP | 2010-146839 A | 7/2010 |

(Continued)

OTHER PUBLICATIONS

Kang Xu, "Nonaqueous Liquid Electrolytes for Lithium-Based Rechargeable Batteries", Oct. 1, 2004, pp. 4303-4417, Chemical Reviews, vol. 104, No. 10.

*Primary Examiner* — Lingwen R Zeng
(74) *Attorney, Agent, or Firm* — Kenneth E. Horton; Kirton McConkie

(57) ABSTRACT

Disclosed is a high heat resistance composite separator including a porous substrate having a plurality of pores, an inorganic coating layer formed on one surface of the porous substrate, the inorganic coating layer including a plurality of inorganic particles and a binder polymer disposed on a portion or all of surfaces of the inorganic particles to connect and bind the inorganic particles, and a high heat resistance polymer coating layer formed on the other surface of the porous substrate, the high heat resistance polymer coating layer including a high heat resistance polymer and inorganic particles dispersed in the high heat resistance polymer.

8 Claims, 14 Drawing Sheets

(52) U.S. Cl.
CPC ....... *H01M 2/1646* (2013.01); *H01M 2/1653* (2013.01); *H01M 10/052* (2013.01); *H01M 10/4235* (2013.01); *Y02T 10/7011* (2013.01)

(58) Field of Classification Search
CPC ... H01M 2/166; H01M 2/1686; Y02E 60/122; Y02T 10/7011
See application file for complete search history.

(56) References Cited

U.S. PATENT DOCUMENTS

| | | |
|---|---|---|
| 2007/0190408 A1 | 8/2007 | Inoue et al. |
| 2008/0070107 A1 | 3/2008 | Kasamatsu et al. |
| 2011/0027642 A1* | 2/2011 | Lee .................... B01D 67/0079 429/145 |
| 2011/0027658 A1* | 2/2011 | Kim .................... H01M 2/1646 429/247 |
| 2011/0195294 A1 | 8/2011 | Lee et al. |

FOREIGN PATENT DOCUMENTS

| | | |
|---|---|---|
| JP | 2010-218749 | 9/2010 |
| KR | 10-1029672 B1 | 4/2011 |

* cited by examiner

HIGH HEAT RESISTANCE COMPOSITE SEPARATOR FOR LITHIUM SECONDARY BATTERY AND LITHIUM SECONDARY BATTERY INCLUDING SAME

TECHNICAL FIELD

The present disclosure relates to a high heat resistance composite separator for a lithium secondary battery and a lithium secondary battery including the same. More particularly, the present disclosure relates to a composite separator that has superior shape stability at high temperature and a high mechanical strength as well as a shut-down function, and a lithium secondary battery including the same.

The present application claims priority to Korean Patent Application No. 10-2011-0133354 filed in the Republic of Korea on Dec. 13, 2011, the disclosures of which are incorporated herein by reference.

BACKGROUND ART

With the rapid development of electronic, communication and computer industries, mobile electronic communication equipments, such as, for example, camcorders, mobile phones, laptop computers, and the like, have been advancing remarkably. Accordingly, the demand for lithium secondary batteries as a power source of mobile electronic communication equipments is increasing day by day. In particular, recently, research and development has been actively made all over the world including Japan, Europe, USA as well as Korea, in relation to the applications of lithium secondary batteries not only as a power source of mobile electronic equipments but also as an environment-friendly power source of larger scale equipments, for example, electric vehicles, uninterruptible power supplies, electromotive tools, satellites, and the like.

Generally, a lithium secondary battery includes a cathode of lithium-transition metal composite oxide, an anode capable of intercalating or disintercalating lithium ions, a separator interposed between the cathode and the anode, and an electrolyte that helps the migration of lithium ions.

The main function of the separator is to holding the electrolyte therein to provide high ion permeability as well as isolating the cathode from the anode. Recently, a separator having a shut-down function has been suggested, in which, for example, when a short circuit occurs in a battery, a part of the separator melts to stop pores so as to keep a large amount of electric current from flowing into the battery. Also, techniques have been suggested to prevent cathode and anode plates from coming into contact with each other by increasing an area of a separator larger than those of the cathode and anode plates, however, in this case, an additional function is required to keep an internal short circuit of a battery caused by the contact of the two electrode plates from occurring by preventing a separator from shrinking due to an increase in internal temperature. In particular, to keep up with the recent trend of a lithium secondary battery toward higher capacity and higher energy density, higher heat resistance and thermal stability than required for a conventional separator is required because temperature in a battery rises when a high rate charge/discharge state of the battery is continuously maintained.

In the conventional separator, a porous membrane made in a form of a sheet using polyolefin-based polymer such as polyethylene (PE) or polypropylene (PP) has been widely used. A separator made from polyethylene having a melting temperature of 130° C. or polypropylene having a melting temperature of 170° C. stops micropores to block (shut down) the movement of ions in response to heat generated when an excessive amount of electric current flows into a battery by a short circuit or an increase in the internal temperature by the effect of a certain external factor, and along with this, thermally shrinks or melts to fulfil a separation function.

In addition to the shut-down feature, shape stability is another important quality of the separator when the temperature continues to increase even subsequent to shut-down. When used in the melting temperature range of polyethylene or polypropylene, if the temperature of the battery continues to increase by internal/external factors even subsequent to shut-down, the separator melts and loses its shape, which causes a short circuit of electrodes, getting into a dangerous situation.

To solve this problem, development of a composite separator for a lithium secondary battery has been reported. First, Korean Patent Publication No. 10-2011-0011932 improves thermal stability by coating ceramic responsible for enhancing mechanical properties and ionic polymer on polyolefin-based resin.

Also, Korean Patent Publication No. 10-2010-0129471 increases a mechanical strength and provides acid resistance by coating with inorganic powder, thereby improving performance and life characteristics. However, this art involves coating with an inorganic matter which increases in the separator weight and consequently the overall battery weight, causing a reduction in energy density. Also, because inorganic fillers vulnerable to reaction with a majority of carbonate are used, $CO_2$ gas and other gases are generated by decomposition of a carbonate-based solvent being commonly used, and when left unused for a long time, a bulging phenomenon of a cell is observed, hence there is a limitation in improving battery stability.

PCT/EP2003/007163, which provides large inorganic particles to the surface and inside, reduces a density increase of a hybrid separator and when it reaches a high temperature, brings about shut-down by penetration of an inorganic matter into pores, but improves safety due to having no melting point. However, this also has a factor hindering stability because gas is generated by a decomposition reaction of the used inorganic matter, that is, Si-based, with an electrolyte solution.

Recently, many attempts have been made to coat and graft polyvinylidene fluoride (PVdF) onto a polyolefin-based porous membrane by a method of double-coating polymer. However, due to low heat resistance, polyolefin melts and micropores disappear when an internal temperature of a battery exceeds 150° C., and thus, an ion blocking effect is superior but when a microporous polymer membrane melts, a membrane area reduces due to a very high volume shrinkage ratio, as a consequence, an internal short circuit of a battery occurs, causing a problem with safety of the battery.

Japanese Patent Publication No. JP-P-2007-122026 manufactures and uses a laminated porous film by coating a molten thermoplastic resin in a form of a non-woven fabric onto a porous film, and this provides excellent thermal safety, but the non-woven fabric form is exposed to an internal short circuit hazard, and due to high porosity, a large amount of electrolyte solutions needs to be used, resulting in a reduced energy density.

DISCLOSURE

Technical Problem

Therefore, an object of the present disclosure is to providing a high heat resistance composite separator having a high mechanical strength, a shut-down function, less heat shrinkage, heat resistance, high ionic conductivity, and superior adhesion with an electrode.

Also, another object of the present disclosure is to providing a lithium secondary battery with such high heat resistance composite separator that improves safety and stability without deterioration in electrochemical properties of the battery.

Technical Solution

To achieve the above objects, according to one aspect of the present disclosure, there is provided a high heat resistance composite separator including a porous substrate having a plurality of pores, an inorganic coating layer formed on one surface of the porous substrate, the inorganic coating layer including a plurality of inorganic particles and a binder polymer disposed on a portion or all of surfaces of the inorganic particles to connect and bind the inorganic particles, and a high heat resistance polymer coating layer formed on the other surface of the porous substrate, the high heat resistance polymer coating layer including a high heat resistance polymer and inorganic particles dispersed in the high heat resistance polymer.

The porous substrate may be a polyolefin-based porous membrane or non-woven fabric.

The porous substrate may be formed from any one selected from the group consisting of polyethylene, polypropylene, polybutylene, polypentene, polymethylpentene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and their copolymers, or mixtures thereof.

The inorganic particles may be selected from the group consisting of inorganic particles having a dielectric constant greater than or equal to 5, inorganic particles capable of transporting lithium ions, and mixtures thereof.

The inorganic particles having the dielectric constant greater than or equal to 5 may be any one selected from the group consisting of $BaTiO_3$, $Pb(Zr_x,Ti_{1-x})O_3$ (PZT, $0<x<1$), $Pb_{1-x}La_xZr_{1-y}Ti_yO_3$(PLZT, $0<x<1$, $0<y<1$), $(1-x)Pb(Mg_{1/3}Nb_{2/3})O_3-xPbTiO_3$(PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or mixtures thereof.

The inorganic particles capable of transporting lithium ions may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ based glass ($Li_xSi_yS_z$, $0<x<3$, $0<y<2$, $0<z<4$) and $P_2S_5$ based glass ($Li_xP_yS_z$, $0<x<3$, $0<y<3$, $0<z<7$), or mixtures thereof.

The binder polymer may be any one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or mixtures thereof.

The high heat resistance polymer may be any one selected from the group consisting of aromatic polyamide, aromatic polyimide, aromatic polyamide-imide, aromatic polyimine, Teflon® (polytetrafluoroethylene), polybenzoxazole, polybenzimidazole, polyphenylsulfide and polyphenylene oxide, or mixtures thereof.

The aromatic polyamide may be para-type aromatic polyamide, meta-type aromatic polyamide, and their mixture.

The inorganic coating layer may include the binder polymer in a range of 0.1 to 50 parts by weight based on 100 parts by weight of the inorganic particles.

The high heat resistance polymer coating layer may include the inorganic particles in a range of 0.1 to 40 parts by weight based on 100 parts by weight of the high heat resistance polymer.

The separator may have porosity in a range of 30 to 70% and air permeability in a range of 150 to 400 sec/100 ml.

At least one of the inorganic coating layer and the high heat resistance polymer coating layer may further include any one lithium secondary battery performance enhancing additive selected from the group consisting of a solid electrolyte interface forming additive, a battery side-reaction suppressing additive, a thermal stability enhancing additive and an overcharge inhibiting additive, or mixtures thereof.

The solid electrolyte interface forming additive may be any one selected from the group consisting of vinylene carbonate, vinylethylene carbonate, cyclic sulfite, saturated sultone, unsaturated sultone, non-cyclic sulfone and their derivatives, or mixtures thereof.

The battery side-reaction suppressing additive may be one selected from the group consisting of ethylenediaminetetraacetic acid, tetramethylethylenediamine, pyridine, dipyridyl, ethylbis(diphenylphosphine), butyronitrile, succinonitrile, iodine, ammonium halide and their derivatives, or mixtures thereof.

The thermal stability enhancing additive may be one selected from the group consisting of hexamethyldisiloxane, hexamethoxycyclotriphosphazene, hexamethylphosphoramide, cyclohexylbenzene, biphenyl, dimethylpyrrole, trimethylphosphate and their derivatives, or mixtures thereof.

The overcharge inhibiting additive may be one selected from the group consisting of n-butylferrocene, halogen substituted benzene derivative, cyclohexylbenzene and biphenyl, or mixtures thereof.

A content of the lithium secondary battery performance enhancing additive may be in a range of 0.5 to 20 parts by weight based on 100 parts by weight of the inorganic coating layer and the high heat resistance polymer coating layer.

According to another aspect of the present disclosure, there is provided a lithium secondary battery including a cathode, an anode, and a separator interposed between the cathode and the anode, wherein the separator is the above-described high heat resistance composite separator.

Advantageous Effects

According to one aspect of the present disclosure, there is provided a high heat resistance composite separator with superior safety, in which heat shrinkage at high temperature is suppressed due to heat resistance characteristics and a high mechanical strength by coating inorganic particles on one surface of a porous substrate, and heat shrinkage at high temperature is suppressed and a shape change caused by external penetration is prevented by coating a high heat resistance polymer having no safety melting point on the other surface of the porous substrate, and a lithium secondary battery including the same.

Also, the high heat resistance composite separator is capable of forming a large number of pores, which improves performance in holding an electrolyte solution, resulting in favorable movement of ions, thereby contributing to fabrication of a lithium secondary battery with high output and long life cycle characteristics.

DESCRIPTION OF DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

MODE FOR DISCLOSURE

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

According to one aspect of the present disclosure, disclosed is a high heat resistance composite separator including a porous substrate having a plurality of pores, an inorganic coating layer formed on one surface of the porous substrate and including a plurality of inorganic particles and a binder polymer disposed on a portion or all of surfaces of the inorganic particles to connect and bind the inorganic particles, and a high heat resistance polymer coating layer formed on the other surface of the porous substrate and including a high heat resistance polymer and inorganic particles dispersed in the high heat resistance polymer.

Figure 1:
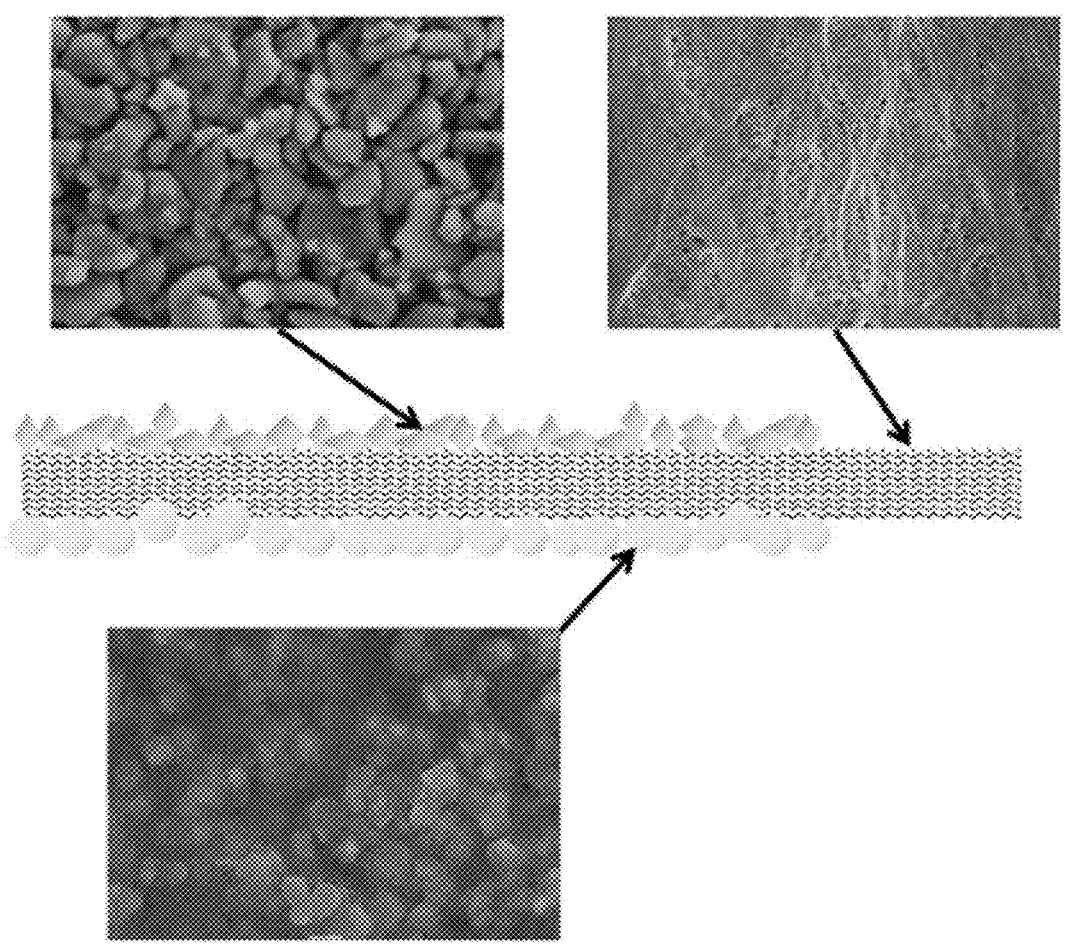
FIG. 1 is a schematic cross-sectional view illustrating a high heat resistance composite separator according to an exemplary embodiment and a scanning electron microscopy (SEM) image of elements of the separator.

FIG. 1 illustrates schematically a high heat resistance composite separator according to an exemplary embodiment of the present disclosure. Referring to FIG. 1, the separator according to an exemplary embodiment of the present disclosure has a composite porous sheet structure in which a porous substrate is coated with inorganic particles on an upper surface thereof and a high heat resistance polymer on a lower surface thereof.

In the high heat resistance composite separator according to an exemplary embodiment of the present disclosure, for the porous substrate on which the inorganic coating layer is formed, any porous substrate commonly employed in a lithium secondary battery may be used, for example, a polyolefin-based porous membrane or non-woven fabric, but the porous substrate is not particularly limited thereto.

The polyolefin-based porous membrane may be, for example, membranes formed from polyethylene such as high density polyethylene, linear low density polyethylene, low density polyethylene and ultra high molecular weight polyethylene, polypropylene, polybutylene, polypentene, polymethylpentene, and their copolymers, singularly or in combination.

The non-woven fabric may be, other than a polyolefin-based non-woven fabric, for example, non-woven fabrics formed from polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, and their copolymers, singularly or in combination. A structure of the non-woven fabric may be a spunbond non-woven fabric made from long fibers or a meltblown non-woven fabric.

Because the porous substrate has a predetermined melting point based on a specific material being manufactured, when temperature inside a lithium secondary battery increases up to the melting point of the porous substrate, the porous substrate starts to melt and loses its pore structure inside, and as a result, the porous substrate performs a shut-down function to keep ions from moving. To fulfill the shut-down function, the melting point of the porous substrate may be in a range of 110 to 160° C.

Thickness of the porous substrate is not particularly limited, but may be in a range of 5 to 50 μm or in a range of 10 to 30 μm, and a pore size and porosity of the porous substrate is also not particularly limited, but may be in a range of 0.01 to 50 μm and in a range of 30 to 80%, respectively. Also, air permeability of the porous substrate may be in a range of 100 to 300 sec/100 ml, and a breaking strength may be 1,000 kgf/cm$^2$ or higher in vertical and horizontal directions.

The inorganic particles are not particularly limited if they are electrochemically stable and may minimize a decomposition reaction with an electrolyte solution. That is, the inorganic particles are not particularly limited if they do not cause oxidation and/or reduction reactions in an operating voltage range (for example, from 0 to 5V for Li/Li$^+$) of an electrochemical device to be applied. In particular, when inorganic particles capable of transporting ions are used, ionic conductivity within an electrochemical device may be increased, contributing to performance improvement. These inorganic particles may improve thermal and mechanical properties of the separator because they exhibit strong mechanical properties and excellent heat resistance at high temperature.

Also, when inorganic particles having a high dielectric constant are used as the inorganic particles, the degree of dissociation of an electrolyte salt, for example, a lithium salt, in a liquid electrolyte may increase and ionic conductivity of the electrolyte solution may be improved.

For these reasons, the inorganic particles may include inorganic particles having a high dielectric constant greater than or equal to 5 or greater than or equal to 10, inorganic particles capable of transporting lithium ions, or a mixture thereof.

Non-limiting examples of the inorganic particles having the dielectric constant greater than or equal to 5 include $BaTiO_3$, $Pb(Zr_xTi_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_3-xPbTiO_3$ (PMN-PT, 0<x<1), hafnia ($HfO_2$), $SrTiO_3$, $SnO_2$, $CeO_2$, MgO, NiO, CaO, ZnO, $ZrO_2$, $Y_2O_3$, $Al_2O_3$, SiC and $TiO_2$, singularly or in combination.

Particularly, inorganic particles such as $BaTiO_3$, $Pb(Zr_xTi_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_3-xPbTiO_3$ (PMN-PT, 0<x<1), and hafnia ($HfO_2$) described in the foregoing not only exhibit high dielectric constant characteristics greater than or equal to 100 but also have piezoelectricity to protect both electrodes from internal short circuits when an external impact is applied, ensuring improved safety of a lithium secondary battery, and here, piezoelectricity is a phenomenon in which charges are created as a result of tension or compression under a certain pressure to generate a potential difference between opposite sides. Also, the use of a mixture of the high dielectric constant inorganic particles and the inorganic particles capable of transporting lithium ions can produce enhanced synergistic effects.

The inorganic particles capable of transporting lithium ions refer to an inorganic particle that contain lithium atoms and have a function of transferring a lithium ion without storing lithium, and the inorganic particles capable of transporting lithium ions can transfer and move a lithium ion due to a sort of defect present within its particle structure, thereby conductivity of lithium ions in a battery may be improved, contributing to battery performance improvement.

Non-limiting examples of the inorganic particles capable of transporting lithium ions include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ based glass (0<x<4, 0<y<13) such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitride ($Li_xN_y$, 0<x<4, 0<y<2) such as $Li_3N$, $SiS_2$ based glass ($Li_xSi_yS_z$, 0<x<3, 0<y<2, 0<z<4) such as $Li_3PO_4$—$Li_2S$—$SiS_2$, $P_2S_5$ based glass ($Li_xP_yS_z$, 0<x<3, 0<y<3, 0<z<7) such as $LiI$—$Li_2S$—$P_2S_5$, or mixtures thereof.

An average particle size of the inorganic particles is not particularly limited, however, to maintain a proper porosity, the average particle size may be in a range of 0.01 to 5 μm, or in a range of 0.1 to 4 μm, or in a range of 0.2 to 0.8 μm. In this instance, when the average particle size of the inorganic particles satisfies this range, problems with deterioration in dispersibility of the inorganic particles, causing non-uniform coating, or battery performance degradation caused by the clogging of the pores of the porous substrate into which the inorganic particles penetrate when coating may be prevented.

In the separator according to one aspect of the present disclosure, for the binder polymer used to form the inorganic coating layer, polymer commonly used in the art to form an inorganic coating layer may be used. Particularly, polymer having a glass transition temperature (Tg) in a range of −200 to 200° C. may be used to improve the mechanical properties of the resulting inorganic coating layer such as flexibility and elasticity. The binder polymer faithfully serves as a binder to connect and stably bind the inorganic particles, thereby preventing deterioration in mechanical properties of the separator with the inorganic coating layer.

Also, the binder polymer does not necessarily need to have an ion conduction ability, but when polymer having an ion conduction ability is used, performance of a lithium secondary battery may be further improved. Accordingly, a binder polymer having a high dielectric constant as possible may be used. Actually, because a degree of dissociation of salts in an electrolyte solution relies on a dielectric constant of an electrolyte solvent, as the dielectric constant of the polymer increases, a degree of dissociation of salts in an electrolyte may be improved. An available dielectric constant of the binder polymer may be in a range of 1.0 to 100 (measured at frequency of 1 kHz), in particular, higher than or equal to 10.

In addition to the above functions, the binder polymer may have a feature that exhibits a high degree of swelling in a liquid electrolyte solution because the binder polymer is gelled when immersed in the electrolyte solution. Accordingly, a solubility parameter of the binder polymer is in a range of 15 to 45 $MPa^{1/2}$, or in a range of 15 to 25 $MPa^{1/2}$, or in a range of 30 to 45 $MPa^{1/2}$. Thus, rather than hydrophobic polymers such as polyolefins, hydrophilic polymers having more polar groups may be used. When the solubility parameter is lower than 15 $MPa^{1/2}$ and higher than 45 $MPa^{1/2}$, swelling in a common liquid electrolyte solution for a battery may be difficult.

Non-limiting examples of the binder polymer may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and the like.

The inorganic coating layer includes, for example, the binder polymer in a range of 0.1 to 50 parts by weight, or in a range of 1 to 40 parts by weight, or in a range of 5 to 30 parts by weight, based on 100 parts by weight of the inorganic particles.

When the content of the inorganic particles and the binder polymer in the inorganic coating layer satisfies this range, heat resistance and mechanical properties may be improved by the coating with the inorganic particles, and adhesion between the porous substrate and the inorganic particles may be maintained and a peel-off phenomenon may be prevented.

In the inorganic coating layer, the binder polymer binds the inorganic particles together to maintain a state in which the inorganic particles are adhered to each other (that is, the binder polymer connects and binds the inorganic particles), and the inorganic coating layer maintains a bound state with the porous substrate by the binder polymer. The inorganic particles of the inorganic coating layer are present in a closest packed structure in a substantial contact state with each other, and interstitial volumes created in the contact state of the inorganic particles become pores of the inorganic coating layer.

The high heat resistance composite separator according to one aspect of the present disclosure includes the high heat resistance polymer coating layer formed on the other surface of the porous substrate, and the high heat resistance polymer coating layer includes the high heat resistance polymer and the inorganic particles dispersed in the high heat resistance polymer.

The high heat resistance polymer represents polymer having a glass transition temperature (Tg) higher than or equal to 150° C. or higher than or equal to 200° C., and among this polymer, particularly, an aromatic condensation-based heat resistance polymer may be primarily used.

Accordingly, when the battery temperature increases, even if the separator substrate made from polyethylene having a melting point in a range of 120 to 130° C. or polypropylene having a melting point in a range of 140 to 150° C. melts, the high heat resistance polymer does not melt, leading to maintenance of a frame of the separator, as a result, a short circuit inside the battery may be prevented.

As a non-limiting example, the high heat resistance polymer may be any one selected from the group consisting of aromatic polyamide, aromatic polyimide, aromatic polyamide-imide, aromatic polyimine, Teflon® (polytetrafluoroethylene), polybenzoxazole, polybenzimidazole, polyphenylsulfide and polyphenylene oxide, or mixtures thereof. Also, the high heat resistance polymer may include copolymers with other polymer components, for example, of less than 50 mole %.

As the high heat resistance polymer, particularly, aromatic polyamide is preferred. Aromatic polyamide refers to a synthetic polymer in which aromatic rings linked by an amide bond (—CONH—), that is, an amide bond attached directly between two aromatic rings is higher than or equal to 80 mole %. The aromatic polyamide is classified into meta-type aromatic polyamide having a flexible molecule chain and para-type aromatic polyamide having a rigid molecule chain, based on a molecular structure.

Specifically, the aromatic polyamide may have at least one repeating unit represented by the following chemical formulae 1 and 2:

[Chemical Formula 1]

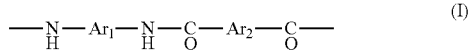

(I)

[Chemical Formula 2]

(II)

In the above formulae, $Ar_1$, $Ar_2$, and $Ar_3$ may be a divalent aromatic group selected among groups of the following chemical formulae 3a through 3d:

[Chemical Formula 3a]

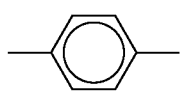

[Chemical Formula 3b]

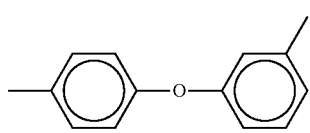

[Chemical Formula 3c]

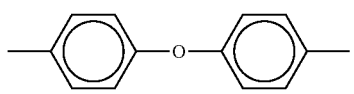

[Chemical Formula 3d]

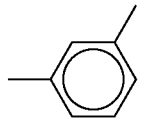

The divalent aromatic groups may be arbitrarily substituted with at least one substituent selected from a halogen atom and an alkyl group having 1-10 carbons. Also, '—O—' links of the above chemical formulae 3b and 3c may be substituted with divalent links such as —$CH_2$—, —CO—, —$SO_2$—, —S—, and —$C(CH_3)_2$—.

The para-type aromatic polyamide represents aromatic polyamide containing 80 to 100 mole % of repeating units of the chemical formula 1 in which 50 mole % or more of divalent aromatic groups represented by $Ar_1$ has a para-structure and 50 mole % or more of divalent aromatic groups represented by $Ar_2$ has a para-structure, or aromatic polyamide containing 80 to 100 mole % of repeating units of the chemical formula 2 in which 50 mole % or more of divalent aromatic groups represented by $Ar_3$ has a para-structure.

Also, the meta-type aromatic polyamide represents aromatic polyamide containing 80 to 100 mole % of repeating units of the chemical formula 1 in which 50 mole % or more of divalent aromatic groups represented by $Ar_1$ has a para-structure and 50 mole % or more of divalent aromatic groups represented by $Ar_2$ has a meta-structure, or aromatic polyamide containing 80 to 100 mole % of repeating units of the chemical formula 2 in which 50 mole % or more of divalent aromatic groups represented by $Ar_3$ has a meta-structure.

The para-type aromatic polyamide may be selected from, for example, poly(paraphenylene terephthalamide), polybenzamide, poly(paraphenylene/3,4'-oxydiphenylene (molar ratio: 50~100/0~50) terephthalamide, and the like.

The meta-type aromatic polyamide may be selected from, for example, poly(metaphenylene isophthalamide), poly(3,4'-oxydiphenylene isophthalamide), poly(metaxylene isophthalamide), and the like.

Para-type aromatic polyamide is being widely used as an industrial material because of high strength, high elasticity, superior heat resistance, and superior chemical resistance. Meanwhile, due to being soluble in an organic solvent well and having high oxidation-reduction resistance, meta-type aromatic polyamide is excellent in terms of durability and may easily form a porous structure, and thus may efficiently produce a separator with excellent permeability.

Particularly, aromatic polyamide as high heat resistance polymer has a feature of a melting point higher than or equal to 300° C., and thus may be advantageously used in the aspect of improvement of heat resistance of the separator.

The inorganic particles included in the high heat resistance polymer coating layer is used for effective maintenance and control of the porous structure, and as a specific example, are the same as inorganic particles included in the inorganic coating layer.

The high heat resistance polymer coating layer includes, for example, 0.1 to 40 parts by weight of inorganic particles, or 1 to 30 parts by weight of inorganic particles, or 5 to 25 parts by weight of inorganic particles, based on 100 parts by weight of the high heat resistance polymer.

In this instance, when the content of the high heat resistance polymer and the inorganic particles satisfies this range, the pores of the high heat resistance polymer coating layer may be formed uniformly.

At least one of the inorganic coating layer and the high heat resistance polymer coating layer may further include a lithium secondary battery performance enhancing additive.

The lithium secondary battery performance enhancing additive is a material required essentially or additionally for operation or performance improvement of an electrochemical device, any material needed to be continuously replenished as it is consumed during operation may be applied without any particular limitations.

Non-limiting examples of the lithium secondary battery performance enhancing additive may include any one of a solid electrolyte interface forming additive, a battery side-reaction suppressing additive, a thermal stability enhancing additive and an overcharge inhibiting additive, or mixtures thereof.

The solid electrolyte interface forming additive may include, but is not limited to, any one selected from the group consisting of vinylene carbonate, vinylethylene carbonate, fluoroethylene carbonate, cyclic sulfite, saturated sultone, unsaturated sultone, non-cyclic sulfone and their derivatives, or mixtures thereof.

The cyclic sulfite may be, for example, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite, the saturated sultone may be, for example, 1,3-propane sultone and 1,4-butane sultone, the unsaturated sultone may be, for example, ethene sultone, 1,3-propene sultone, 1,4-butene sultone and 1-methyl-1,3-propene sultone, and the non-cyclic sulfone may be, for example, divinyl sulfone, dimethyl sulfone, diethyl sulfone, methylethyl sulfone and methylvinyl sulfone.

The battery side-reaction suppressing additive may include, but is not limited to, one selected from the group consisting of ethylenediaminetetraacetic acid, tetramethylethylenediamine, pyridine, dipyridyl, ethylbis(diphenylphosphine), butyronitrile, succinonitrile, iodine, ammonium halide and their derivatives, or mixtures thereof.

The thermal stability enhancing additive may include, but is not limited to, one selected from the group consisting of hexamethyldisiloxane, hex amethoxycyclotriphosphazene, hexamethylphosphoramide, cyclohexylbenzene, biphenyl, dimethylpyrrole and their derivatives, or mixtures thereof.

The overcharge inhibiting additive may include, but is not limited to, one selected from the group consisting of n-butylferrocene, halogen substituted benzene derivative, cyclohexylbenzene and biphenyl, or mixtures thereof.

The lithium secondary battery performance enhancing additive includes, for example, derivatives of each compound, and the derivatives of each compound include a compound in which at least one of hydrogen atoms bonded to a carbon atom for each compound is substituted by halogen.

The content of the lithium secondary battery performance enhancing additive may be in a range of 0.5 to 20 parts by weight, or in a range of 1 to 18 parts by weight, or in a range of 2 to 15 parts by weight, based on 100 parts by weight of the inorganic coating layer and the high heat resistance polymer coating layer.

When the content of the additive satisfies this range, effects of addition are sufficient produced, a problem with a side reaction caused by the release of excess additives may be prevented, and a phenomenon of early cycling degradation of the battery may be prevented.

A method of manufacturing a separator according to one aspect of the present disclosure is illustrated below, but is not limited in this regard.

First, a composition for an inorganic coating layer is prepared. The composition for the inorganic coating layer includes inorganic particles, a binder polymer, and a solvent, and in this instance, may further include at least one lithium secondary battery performance enhancing additive according to necessity.

In this instance, the content of the inorganic particles may be, for example, in a range of 3 to 50 parts by weight, or in a range of 10 to 45 parts by weight, or in a range of 15 to 40 parts by weight, based on 100 parts by weight of the composition for the inorganic coating layer. When the content of the inorganic particles satisfies this range, heat resistance and mechanical properties of the separator may be improved by the coating of the inorganic particles, and adhesion with the porous substrate may be maintained, thereby preventing a peel-off phenomenon.

The content of the binder polymer in the composition for the inorganic coating layer may be, for example, in a range of 0.1 to 15 parts by weight, in a range of 0.5 to 10 parts by weight, or in a range of 1 to 7 parts by weight, based on 100 parts by weight of the composition for the inorganic coating layer. When the content of the binder polymer satisfies this range, the bond strength between the inorganic particles and the porous substrate may be improved, thereby preventing a peel-off phenomenon of ceramic powder, and viscosity of the composition is at a proper level, thereby enhancing dispersibility of the inorganic particles, hence uniformness of coating may be improved.

As the solvent, any solvent having high solubility for polymer may be used without any limitations. Examples of available solvents may include, but are not limited to, any one selected from the group consisting of N-methyl-2-pyrrolidone (NMP), acetone, ethanol, tetrahydrofuran (THF), dimethyl acetamide (DMAc), and toluene, or mixtures thereof.

The content of the solvent may be in a range of 45 to 95 parts by weight, in a range of 50 to 85 parts by weight, or in a range of 55 to 80 parts by weight, based on 100 parts by weight of the composition for the inorganic coating layer, and when the content of the solvent satisfies this range, dispersibility is ensured when preparing the composition for the coating layer, and favorable viscosity adjustment for coating may be achieved.

Subsequently, a composition for a high heat resistance polymer coating layer is prepared. The composition for the high heat resistance polymer coating layer includes a high heat resistance polymer, inorganic particles, and a solvent, and may further include at least one lithium secondary battery performance enhancing additive according to necessity as described in the foregoing.

The content of the high heat resistance polymer may be in a range of 30 to 60 parts by weight, or in a range of 35 to 55 parts by weight, or in a range of 40 to 50 parts by weight, based on 100 parts by weight of the composition for the high heat resistance polymer coating layer. When the content of the high heat resistance polymer satisfies this range, heat resistance of the separator may be improved and adhesion with the porous sheet may be improved, thereby preventing a peel-off phenomenon.

The content of the inorganic particles may be in a range of 1 to 20 parts by weight, or in a range of 3 to 17 parts by weight, or in a range of 5 to 15 parts by weight, based on 100 parts by weight of the composition for the high heat resistance polymer coating layer, and when the content of the inorganic particles satisfies this range, pores may be effectively maintained in the high heat resistance polymer coating layer.

The solvent content may be in a range of 20 to 60 parts by weight, or in a range of 25 to 55 parts by weight, or in a range of 30 to 50 parts by weight, based on 100 parts by weight of the composition for the high heat resistance polymer coating layer, and when the solvent content satisfies this range, dispersibility is ensured when preparing the composition for the coating layer and favorable viscosity adjustment for coating may be achieved.

In this instance, after the composition for the inorganic coating layer and the composition for the high heat resistance polymer coating layer are prepared, pulverization of the inorganic particles may be additionally performed. In this instance, a proper pulverization time may be from 1 to 20 hours, and an average particle size of the pulverized inorganic particles may be in a range of 0.01 to 10 μm. As a pulverization method, a common method may be used, and particularly, a ball mill method may be used.

Subsequently, the composition for the inorganic coating layer is coated on one surface of the porous substrate. In this instance, thickness of the inorganic coating layer being coated may be in a range of 1 to 10 μm, or in a range of 2 to 8 μm, or in a range of 3 to 6 μm. When the thickness of the inorganic coating layer satisfies this range, uniformness of coating and a mechanical strength may be ensured and suppression of thermal deformation is facilitated, so safety of the separator may be maintained and a peel-off phenomenon of the inorganic particles caused by reduced adhesion with the porous substrate may be prevented. Also, the inhibited peel-off phenomenon of the inorganic particles prevents the problems with battery performance deterioration caused by peeled inorganic particles which may act as a resistor, or energy density reduction caused by an increased cell thickness resulting from an increase overall separator thickness during high rate charging/discharging due to reduced air permeability.

The composition for the high heat resistance polymer coating layer is coated on the other surface of the porous substrate, that is, the remaining surface. Thickness of the high heat resistance polymer coating layer being coated may be in a range of 1 to 10 μm, or in a range of 2 to 8 μm, or in a range of 3 to 6 μm. When the thickness of the high heat resistance polymer coating layer satisfies this range, heat resistance of the separator may be improved, thereby ensuring safety, and a peel-off phenomenon of the high heat resistance polymer caused by a reduction in adhesion with the porous substrate may be prevented. Also, the inhibited peel-off phenomenon prevents the problems with battery performance deterioration caused by peeled high heat resistance polymer which may act as a resistor, or an increase in electrolyte solution content to maintain performance due to increased pores and an energy density reduction caused by an increase in overall cell thickness.

A method of coating the inorganic coating layer and the high heat resistance polymer coating layer on the porous substrate is not particularly limited, and common coating methods known in the art may be used. For example, dip coating, die coating, roll coating, gravure coating, spray coating, comma coating, or their combined methods may be selectively used. Also, a coating order of the inorganic coating layer and the high heat resistance polymer coating layer may be selective, and is not particularly limited.

The composite separator according to an exemplary embodiment of the present disclosure may have porosity in a range of 30 to 70%, or in a range of 40 to 55%, and air permeability in a range of 150 to 400 sec/100 ml, or in a range of 200 to 350 sec/100 ml, to ease the movement of ions. Due to formation of the inorganic coating layer and the high heat resistance polymer coating layer, porosity may be increased or decreased but carrying out the coating without a change in characteristics of the porous substrate is the most effective.

Also, when the air permeability exceeds the upper bound value, that is, 400 sec/100 ml, output characteristics are degraded, even though an electrolyte solution holding effect is superior because of many pores, battery performance deterioration occurs due to increased resistance which makes applications for high output difficult.

Preferably, thickness of the composite separator according to an exemplary embodiment of the present disclosure may be, for example, in a range of 5 to 75 μm, or in a range of 10 to 50 μm, or in a range of 18 to 30 μm. When the thickness of the separator satisfies this range, the problems with a failure to sufficiently perform functions of the separator or deterioration in mechanical properties may be prevented, and solution to the problems with deterioration in battery characteristics during high rate charging/discharging due to increased resistance caused by an excessive increase in thickness or an increase in energy density resulting from an increase in overall thickness.

Also, the composite separator should not reduce in a breaking strength by 50% or more or by 30% or more, compared to a breaking strength of the porous substrate itself. Despite the coating of the inorganic particles and the high heat resistance polymer with excellent mechanical properties, the reason why a reduction phenomenon compared to the breaking strength of the porous substrate itself is taken into account is that such phenomenon may occur due to tension applied to the separator in the process of coating manufacture. When the breaking strength of the manufactured composite separator is less than 500 kgf/cm², an unreacted part may be generated by wrinkling occurring in the battery during fabricating the battery, as a consequence, battery safety may be further degraded. Also, because a higher breaking strength is better, in the present disclosure, the upper bound of the breaking strength is not particularly limited.

According to one aspect of the present disclosure, there is provided a lithium secondary battery including a cathode, an anode and a separator interposed between the cathode and the anode, wherein the separator is the above-described high heat resistance composite separator.

A method of fabricating a lithium secondary battery according to an exemplary embodiment of the present disclosure is described as follows.

First, an electrode active material layer is formed on a current collector using an electrode composition including an electrode active material, a binder, a solvent, and optionally a conductive material. In this instance, as a method of forming the electrode active material layer, there is a method which directly coats an electrode active material composition onto a current collector or a method which coats an electrode active material composition on a separate support, dries the composition, and laminates a film peeled off from the support on a current collector. Here, any support may be used if it can support an active material layer, for example, a Mylar® film and a polyethyleneterephthalate (PET) film.

The electrode active material, the binder, the conductive material, and the solvent may be ones commonly used in fabricating a lithium secondary battery.

As the cathode active material, for example, lithium-containing metal oxide such as $LiCoO_2$, $LiNiO_2$ and $LiMn_2O_4$, lithium-containing metal oxide or solid solution oxide obtained by adding Co, Ni or Mn to the above lithium-containing metal oxide, such as, $LiNi_{1-x}Co_xO_2$, $LiNi_xCo_yMn_zO_2$ and $LiNiMnO_2$ $Li_2MnO_3$, and olivine-type such as $LiFePO_4$, $LiCoPO_4$, $LiMnPO_4$ and $LiMnFePO_4$ may be used, and sulfide, selenide, and halide, as well as the exemplary oxide above may be used.

As the anode active material, lithium absorbing materials such as lithium metal or lithium alloys, carbon materials, and the like, may be generally used. For example, as an available carbon material, for example, both low crystallinity carbon and high crystallinity carbon may be used. Representatively, low crystallinity carbon includes soft carbon and hard carbon, and high crystallinity carbon includes high-temperature baked carbon, such as, natural graphite, Kish graphite, pyrolytic carbon, mesophase pitch based carbon fiber, meso-carbon microbeads, Mesophase pitches, and petroleum pitch derived cokes or coal tar pitch derived cokes. The carbon material may have an average particle size of a common anode active material. For example, the average particle size may be from 3 to 60 μm, but is not limited thereto.

As the binder, vinylidenefluoride-hexafluoropropylene copolymer (PVDF-co-HFP), polyvinylidenefluoride, polyacrylonitrile, polymethylmethacrylate, and mixtures thereof may be used. Carbon black and acetylene black are typical of the conductive material, and acetone and N-methylpyrrolidone are typical of the solvent.

In the current collector, as a non-limiting example of a cathode current collector, a foil made from aluminum, nickel, or their combination is given, and as a non-limiting example of an anode current collector, a foil made from copper, gold, nickel, a copper alloy, or their combinations is given.

An electrolyte solution that can be used in the lithium secondary battery according to one aspect of the present disclosure may be an electrolyte solution in which a salt is dissolved or dissociated in an organic solvent, the salt having a structure represented by $A^+B^-$ wherein $A^+$ is an alkali metal cation such as $Li^+$, $Na^+$, $K^+$, or combinations thereof, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The injection of the electrolyte solution may be performed in any suitable step of a battery fabrication process based on a manufacturing process and required physical properties of a final product. That is, the injection of the electrolyte solution may be applied before battery assembly or in the final step of battery assembly.

When the electrode is manufactured by the above method, an electrode assembly is made by inserting the separator between the cathode electrode plate and the anode electrode plate. As a process of applying the separator to the battery, a lamination/stacking process of the separator and the electrode and a folding process as well as a general winding process may be contemplated.

Subsequently, the manufactured electrode assembly is put in a case and an electrolyte solution for a lithium secondary battery is poured, thereby completing a lithium secondary battery.

Hereinafter, the present disclosure will be described in detail through embodiments. However, modifications in different forms may be made to the embodiments of the present disclosure, and the scope of the present disclosure should not be construed as being limited to the following embodiments. The embodiments of the present disclosure are provided to more fully explain the present disclosure to those having ordinary knowledge in the art to which the present disclosure pertains.

<Manufacture of Separator>

Embodiment Example 1

A composition for an inorganic coating layer was prepared by blending 35 parts by weight of $Al_2O_3$, 5 parts by weight of poly(vinylidene fluoride-co-hexafluoropropylene) (PVdF-HFP), and 60 parts by weight of acetone. The prepared composition was coated on one surface of a polyethylene (PE) porous substrate (thickness 16 μm, porosity 47%, air permeability 150.2 sec/100 ml, W-able) at a coating thickness of about 3 μm by a roller coating process with a slip belt speed of about 10M/hr and a drying temperature of 80° C.

A composition for a high heat resistance polymer coating layer was prepared by blending 45 parts by weight of meta-type aromatic polyamide (poly(meta-phenylene isophthalamide)), 10 parts by weight of MgO, and 45 parts by weight of N,N-Dimethylacetamide. The prepared composition for the high heat resistance polymer coating layer was sprayed with a roller onto the opposite surface of the porous substrate to the surface coated with the inorganic particles, and cast at a slip belt speed of about 10M/hr, followed by low temperature solidification (−10° C.) and room temperature solidification (30° C.) steps, a washing step (at least three times) and a drying step (80° C.), as a consequence, a high heat resistance polymer coating layer was coated at thickness of about 3 μm, and then a high heat resistance composite separator was manufactured.

A scanning electron microscopy (SEM) image of the manufactured high heat resistance composite separator of Embodiment example 1 is shown in FIG. 1.

A SEM image of the manufactured high heat resistance composite separator of Embodiment example 1 is shown in FIG. 1. Referring to FIG. 1, the high heat resistance composite separator of Embodiment example 1 includes the polyethylene (PE) porous substrate disposed at the center, the inorganic coating layer formed on an upper surface of the substrate and the high heat resistance polymer coating layer formed on a lower surface of the substrate.

The manufactured high heat resistance composite separator was measured under the condition of 100SLPM/200 psi using CFP-1500AEL, PMI, and as a result, porosity of 48.7% was presented.

Also, the manufactured high heat resistance composite separator was measured under the condition of an amount of air set to 100 ml with a load of 20 kgf using G-B2C, TOYOSEKI, and as a result, air permeability of 232.2 sec/100 ml was presented.

<Fabrication of Lithium Secondary Battery>

Embodiment Example 2-1

As a cathode active material, $LiNi_{(1-x-y)}Mn_xCo_yO_2$ was used and as an anode active material, MGP (China Steel Chemical Corporation) was used, an inorganic coating layer was disposed facing a cathode electrode and a high heat resistance polymer coating layer was disposed facing an anode electrode with the composite separator manufactured in Embodiment example 1 therebetween, and then an aluminum case was applied thereto, to fabricate a lithium secondary battery. A standard size of the battery was 100 mm (thickness)×216 mm (width)×216 mm (length), and a design capacity was 40 Ah.

Embodiment Example 2-2

A lithium secondary battery was fabricated by the same method as Embodiment example 2-1, except that a high heat resistance polymer coating layer was disposed facing a cathode electrode and an inorganic coating layer was disposed facing an anode electrode with the composite separator manufactured in Embodiment example 1 interposed therebetween.

Comparative Example 1

A lithium secondary battery was fabricated by the same method as Embodiment example 2-1, except that only a polyethylene porous substrate was used as a separator.

Comparative Example 2

A lithium secondary battery was fabricated by the same method as Embodiment example 2-1, except that a separator with an inorganic coating layer formed on both surfaces was used.

Physical Properties of Separator

Various physical properties of the separators manufactured according to Embodiment example 1 and Comparative examples 1 and 2 were shown in the following Table 1.

TABLE 1

| | Thickness [μm] | Air permeability [sec/100 ml] | Porosity [%] | Breaking strength [kgf/cm²] | | Heat shrinkage (@150° C./ 1 hr)[%] | | Basic weight [g/m²] |
| | | | | MD (Machine Direction) | TD (Traverse Direction) | MD | TD | |
| --- | --- | --- | --- | --- | --- | --- | --- | --- |
| Embodiment example 1 | 22 | 232.2 | 48.7 | 1,972 | 1,579 | 0.0 | 0.93 | 13.0 |
| Comparative example 1 | 22 | 225.0 | 46.0 | 1,602 | 1,269 | 75.9 | 72.2 | 10.8 |
| Comparative example 2 | 21 | 274.3 | 51.3 | 1,646 | 1,724 | 30.6 | 18.5 | 16.7 |

As seen in Table 1, air permeability of the separator manufactured according to Embodiment example 1 is less than 250 seconds (sec) equally to Comparative example 1, and from this, it is found that there is no change in pores caused by coating, and heat shrinkage in vertical/horizontal directions after 1 hour at 150° C. is less than 1%, which is superior over thermal stability of a separator with an inorganic coating layer formed on both sides according to Comparative example 2. This reveals that thermal control is partially achieved by the inorganic particles, but thermal control may be substantially maximized by coating the high heat resistance polymer having no safety melting point on one surface.

Electrochemical Properties

The batteries manufactured according to Embodiment example 2-1, Embodiment example 2-2, Comparative example 1, and Comparative example 2 were undergone, using a charge/discharge cycle system, CC-CV (constant current-constant voltage) charging of a current density of 8 A (0.2 C) and 4.2V, and after a resting period of 10 minutes, discharging down to 3.0V at 20 A (0.5 C). Then, a charge capacity, a discharge capacity, an initial specific capacity, and initial efficiency for each battery are shown in the following Table 2.

As seen from the foregoing Table 2, in the case of Embodiment example 2-1 using a separator coated with inorganic particles on one surface and high heat resistance polymer on the other surface, efficiency and capacity is superior over Comparative example 2 using a separator coated with inorganic particles on both surfaces, and it can be seen that similar charge/discharge performance to a battery fabricated using only polyethylene porous substrate as a separator according to Comparative example 1 is exhibited. It is considered that this results in a resistance increase caused by inorganic particle coating on both surfaces and deterioration in initial performance caused by a decomposition reaction with an electrolyte solution, however because aramid as high heat resistance polymer or selected inorganic particles has relatively low reactivity with an electrolyte solution, it is considered that Embodiment examples 2-1 and 2-2 will show similar features to a general polyolefin-based separator.

Figure 2:
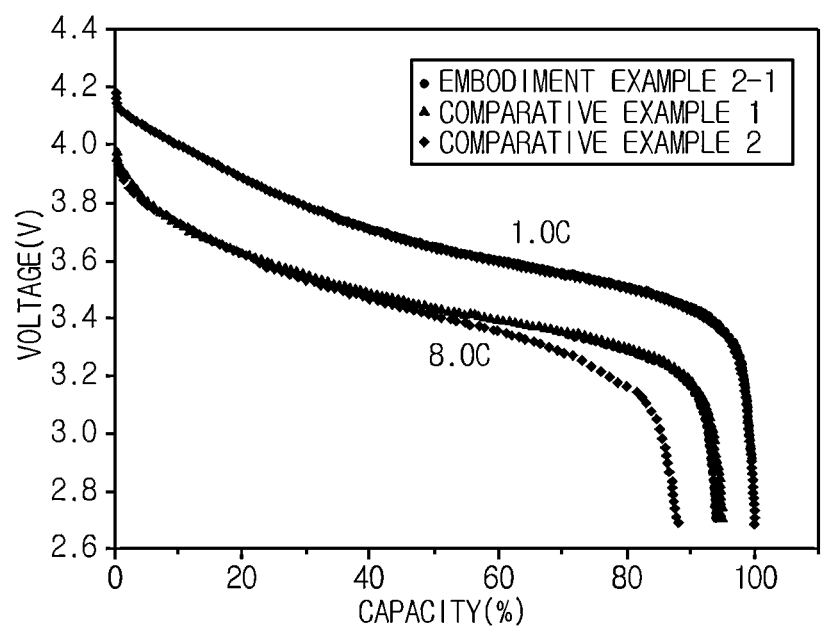
FIG. 2 is a graph showing capacity during high rate discharging of lithium secondary batteries of Embodiment example 2-1, Comparative example 1, and Comparative example 2.
Figure 3:
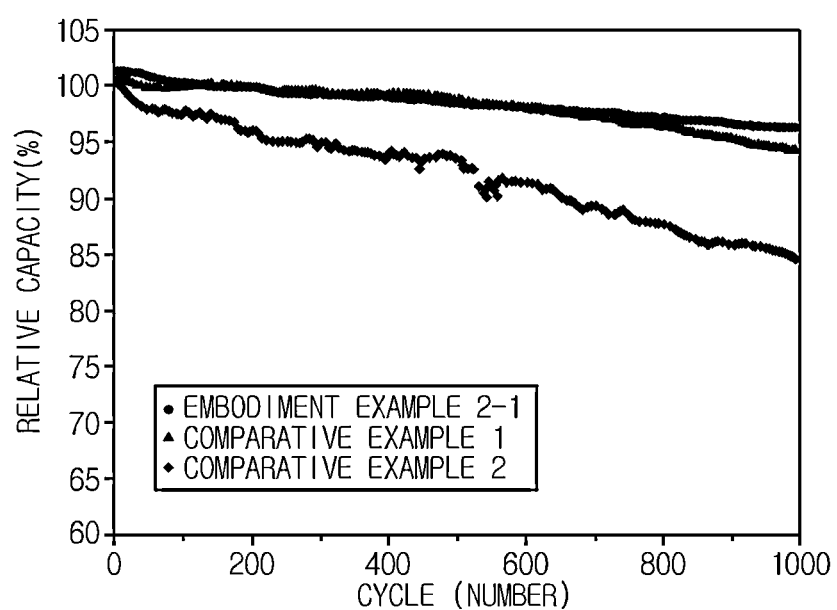
FIG. 3 is a graph showing capacity changes during a life test for lithium secondary batteries of Embodiment example 2-1, Comparative example 1, and Comparative example 2.

A high rate discharge test for the batteries manufactured according to Embodiment example 2-1, Embodiment example 2-2, Comparative example 1, and Comparative example 2 was conducted, using a charge/discharge cycle system, by CC-CV (constant current-constant voltage) charging of a current density of 20 A (0.5 C) and 4.2V, and after a resting period of 10 minutes, discharging down to 2.7V at 320 A (8.0 C), and a room temperature lifespan test was conducted by CC-CV charging of 40 A (1.0 C) and 4.2V, and after a resting period of 10 minutes, discharging down to 3.0V at 40 A (1.0 C), during repeating 1,000 cycles, a capacity change was monitored, and its result is shown Table 2 and FIGS. 2 and 3.

As to the high rate discharge characteristics of the batteries measured by the above test, with respect to a 8.0 C discharge rate, Embodiment example shows 94.21% similar high rate discharge characteristics to Comparative example 1, and regarding the lifespan test, it can be seen that

TABLE 2

| | Initial charge capacity [Ah] | Initial discharge capacity [Ah] | Specific capacity [mAh/g] | Initial efficiency [%] | 8 C discharge efficiency [%] |
| --- | --- | --- | --- | --- | --- |
| Embodiment example 2-1 | 48.30 | 40.86 | 143.49 | 84.60 | 94.21% |
| Embodiment example 2-2 | 48.32 | 40.88 | 143.56 | 84.60 | 94.03% |
| Comparative example 1 | 48.29 | 40.96 | 143.84 | 84.82 | 94.25% |
| Comparative example 2 | 49.13 | 40.03 | 140.57 | 81.47 | 90.05% |

Embodiment example shows a higher capacity retention ratio by about 10%, after 1,000 cycles, than Comparative example 2 using a separator coated with inorganic particles on both surfaces.

All that can be seen from the above tests is that in the case where inorganic particles are coated on both surface, there is a risk of degrading the cycling characteristics caused by an increase in reactivity of ceramic with an electrolyte solution over cycles for a long time together with an efficiency reduction of high rate discharge caused by increased resistance, whereas in the case of Embodiment examples 1 and 2 coated with inorganic particles on one surface and high heat resistance polymer on the other surface maintains similar porosity to a polyolefin-based separator, thereby maintaining battery performance, and undergoes a relatively less decomposition reaction with an electrolyte solution over cycling for a long time.

Safety Test

Overcharge characteristics and nail penetration tests were conducted on the batteries manufactured according to Embodiment example 2-1, Embodiment example 2-2, Comparative example 1, and Comparative example 2. The overcharge test has measured voltage behaviors and surface temperature of the battery during overcharge, by charging up to 12V at a current density of 40 A (1.0 C), and the nail penetration test has measured voltage behaviors and surface temperature of the battery when the battery was pierced by a nail having a diameter of 30 at a rate of 80 mm/sec. The thermal shock test has measured voltage behaviors and surface temperature of the battery when maintaining at 150±2° C. for 60 minutes after putting a cell in an oven of 25±2° C. and increasing the temperature by 5° C. every minute.

The characteristics of the batteries measured by the above tests are shown in Table 3.

Figure 4A:
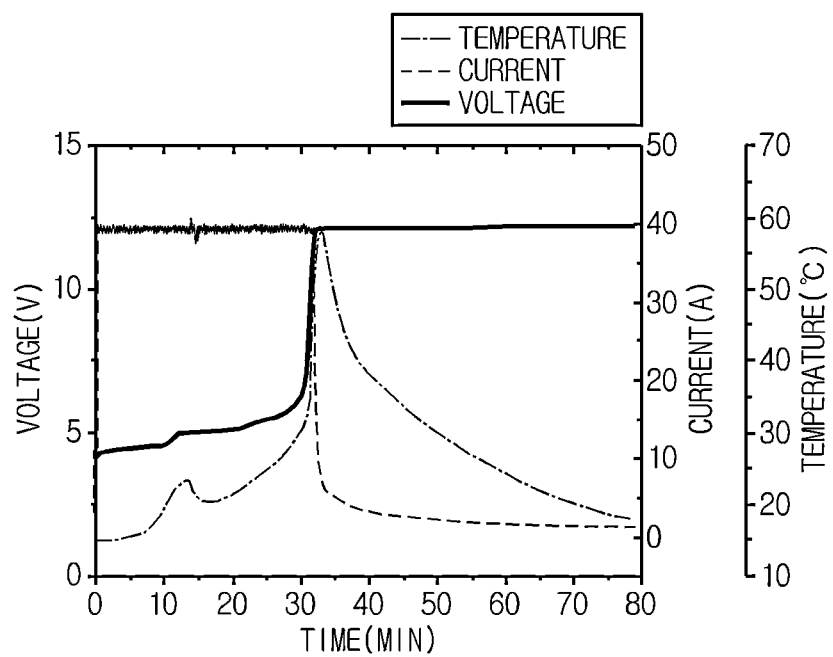
FIGS. 4a through 4c are graphs each showing battery voltage behaviors and surface temperature changes during overcharging for lithium secondary batteries of Embodiment example 2-1, Comparative example 1, and Comparative example 2.
Figure 4B:
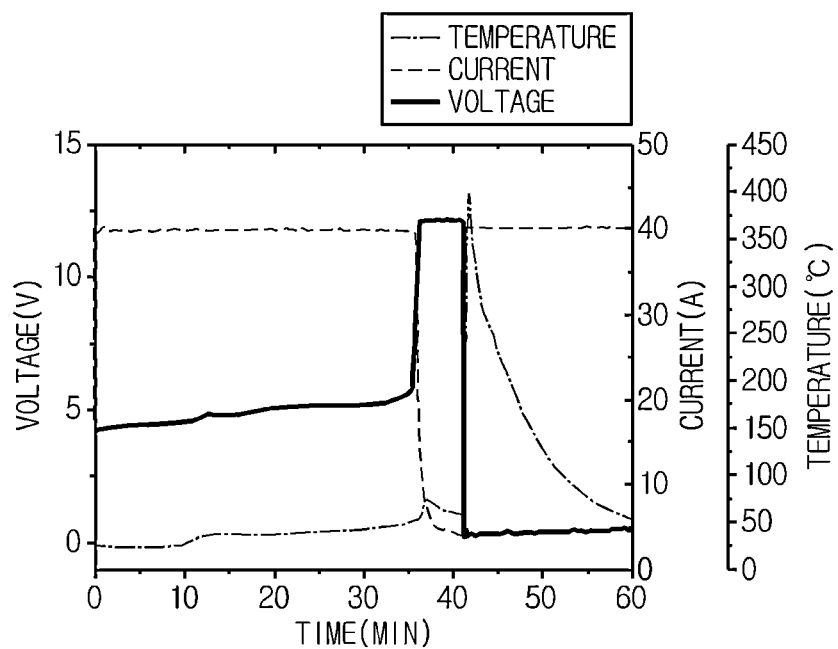
Figure 4C:
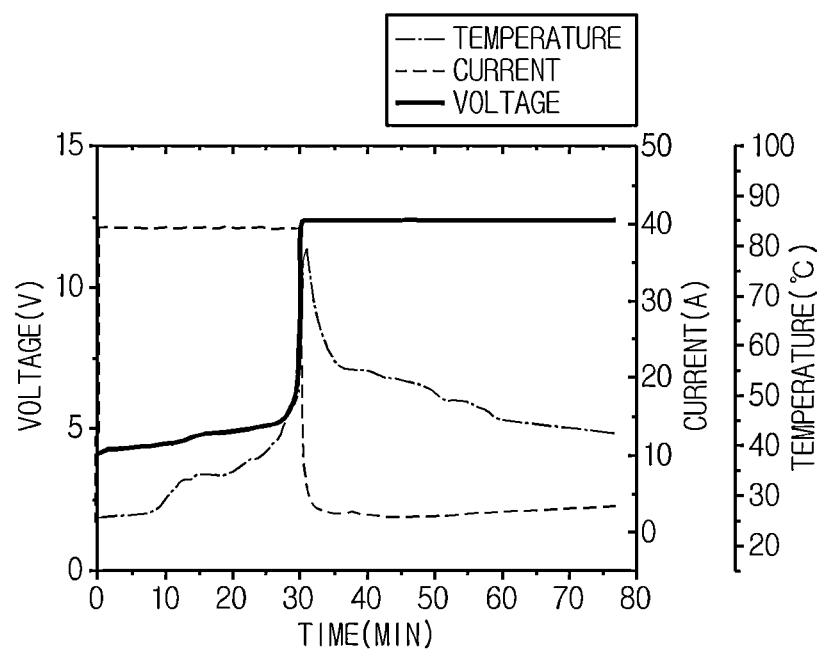
Figure 5A:
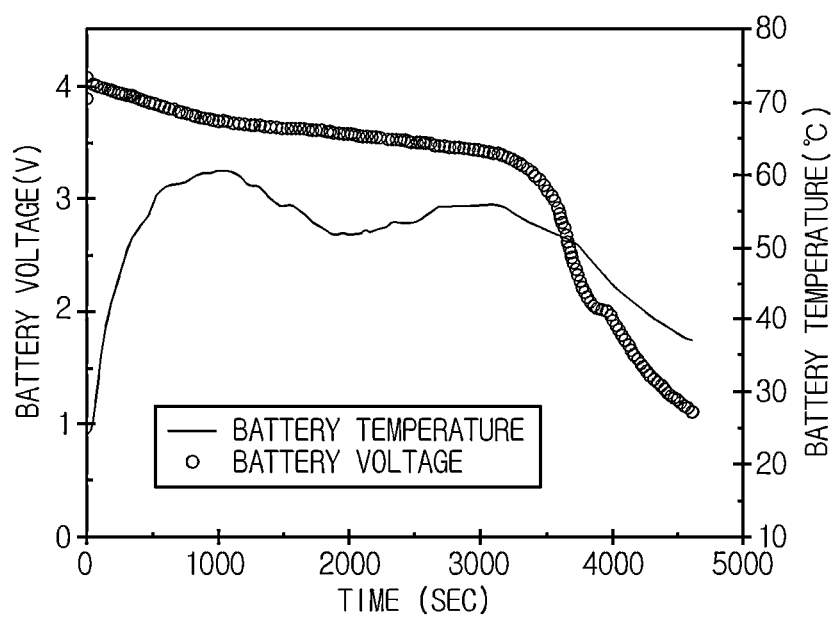
FIGS. 5a through 5d are graphs each showing battery voltage behaviors and surface temperature changes derived from a nail penetration test for lithium secondary batteries of Embodiment example 2-1, Embodiment example 2-2, Comparative example 1, and Comparative example 2.
Figure 5B:
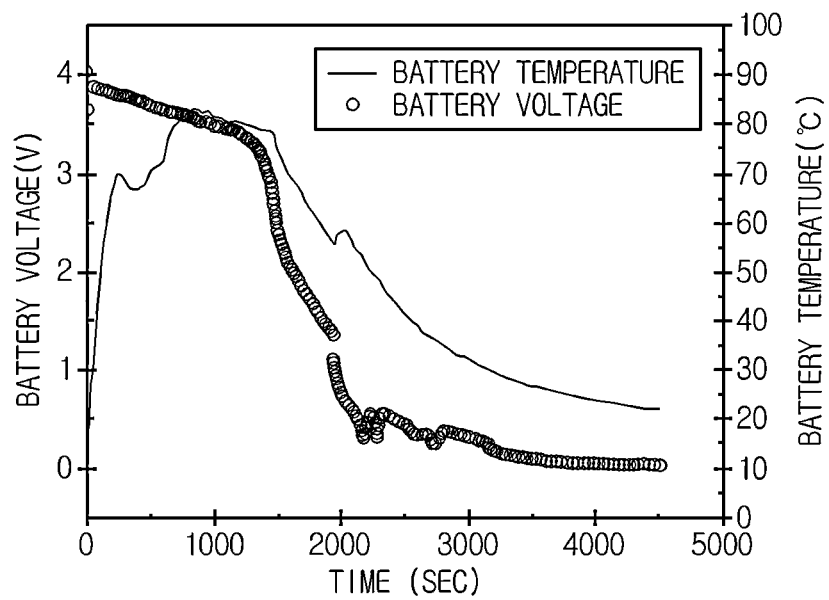
Figure 5C:
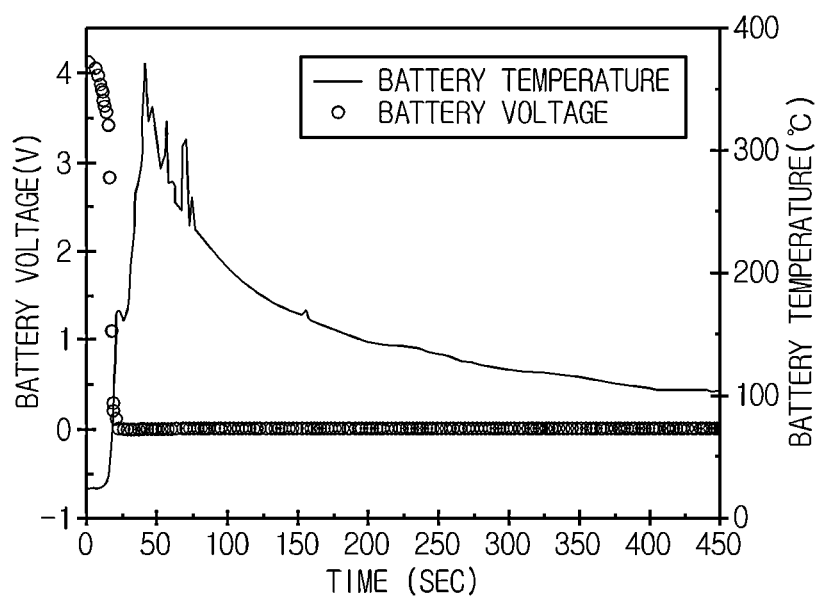
Figure 5D:
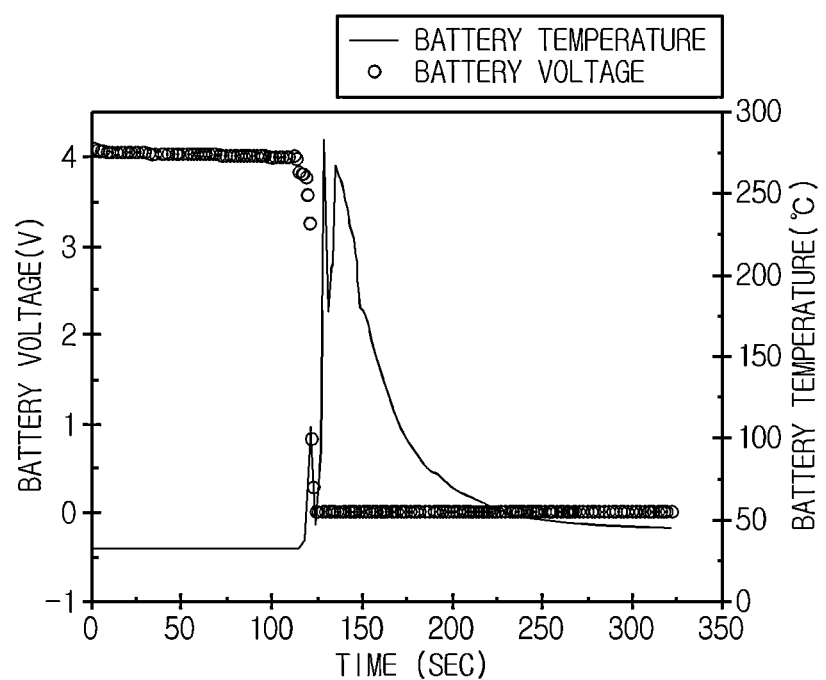
Figure 6A:
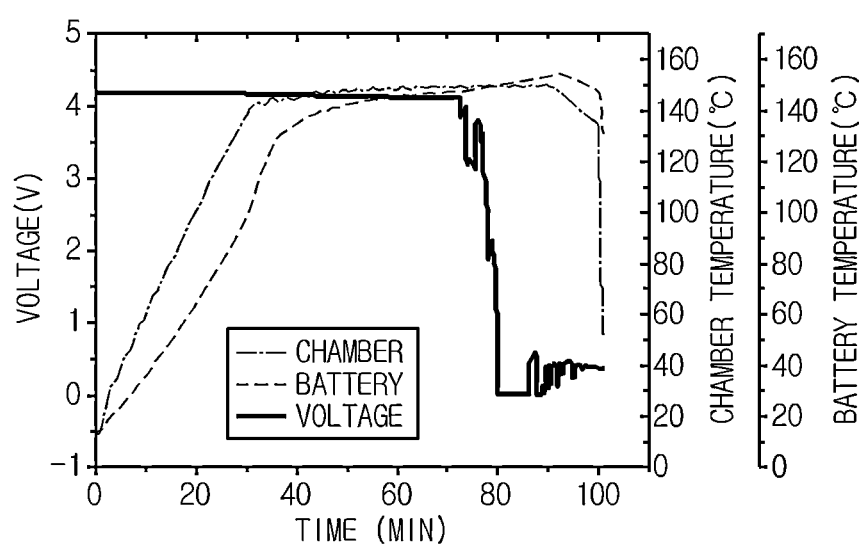
FIGS. 6a through 6c are graphs each showing battery voltage behaviors and surface temperature changes derived from a thermal shock test for lithium secondary batteries of Embodiment example 2-1, Comparative example 1, and Comparative example 2.
Figure 6B:
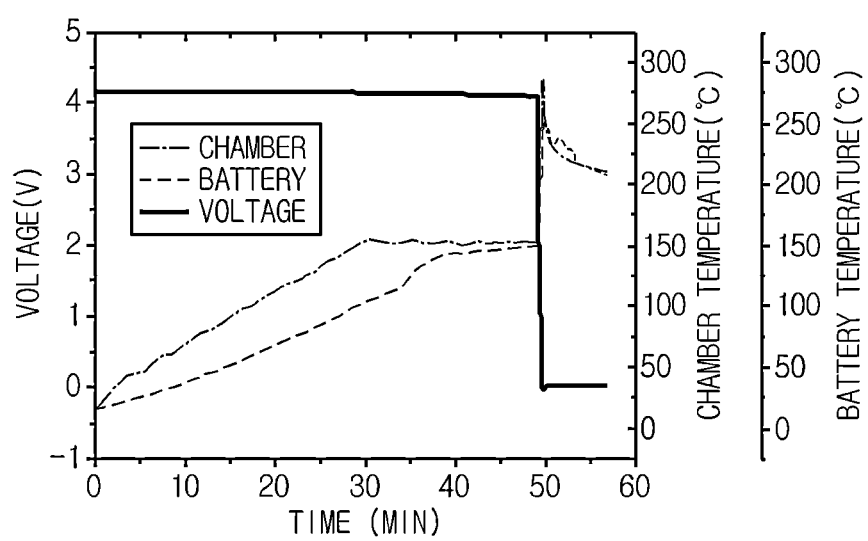
Figure 6C:
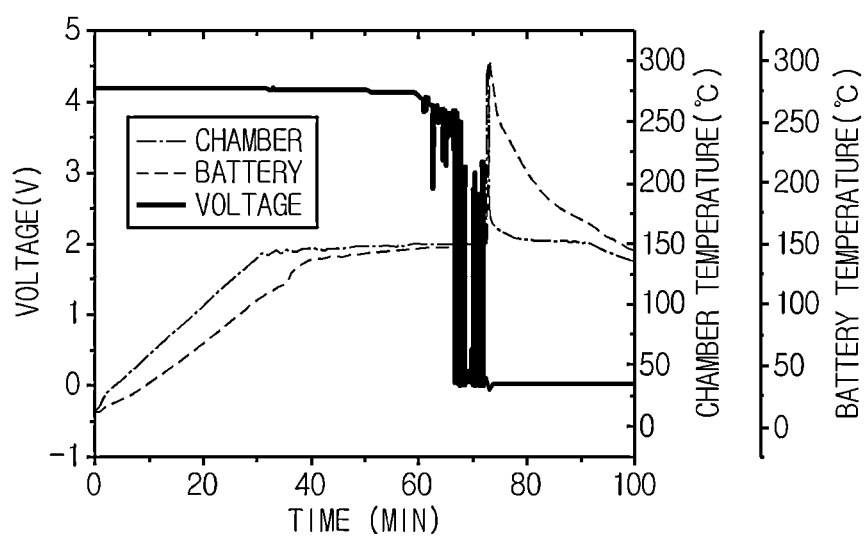
Figure 7:
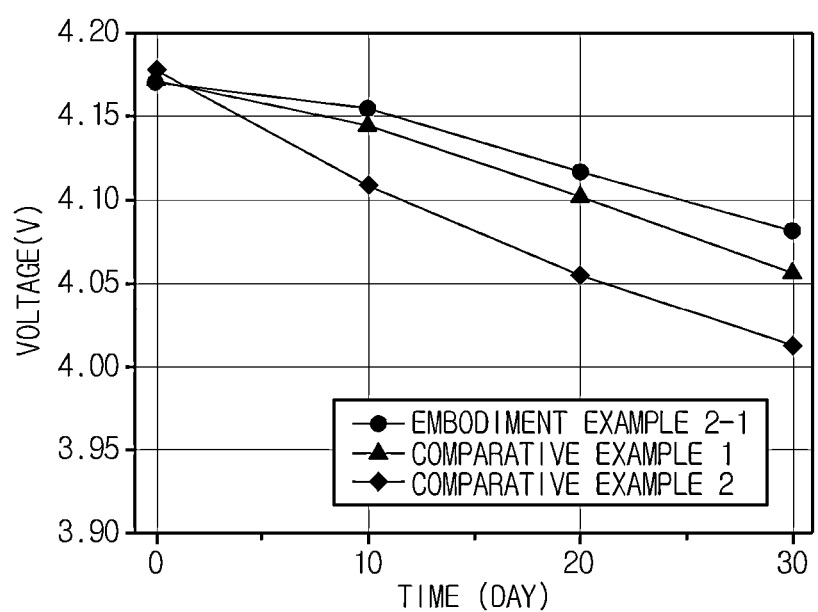
FIG. 7 is a graph showing voltage changes during one month storage at high temperature for lithium secondary batteries of Embodiment example 2-1, Comparative example 1, and Comparative example 2.

Also, voltage behaviors and surface temperature changes of the battery during overcharge for Embodiment example and Comparative examples were observed and each result is shown in FIG. 4a (Embodiment example 2-1), FIG. 4b (Comparative example 1), and FIG. 4c (Comparative example 2), and voltage behaviors and surface temperature changes of the battery during nail penetration were observed and each result is shown in FIG. 5a (Embodiment example 2-1), FIG. 5b (Embodiment example 2-2), FIG. 5c (Comparative example 1), and FIG. 5d (Comparative example 2). Also, voltage behaviors and surface temperature changes during thermal shock were observed and each result is shown in FIG. 6a (Embodiment example 2-1), FIG. 6b (Comparative example 1), and FIG. 6c (Comparative example 2).

TABLE 3

| | Overcharge | Nail penetration | Thermal shock |
|---|---|---|---|
| Embodiment example 2-1 | A, 58.2° C. | A, 60.8° C. | A, >60 min |
| Embodiment example 2-2 | A, 62.3° C. | A, 83.6° C. | A, >60 min |
| Comparative example 1 | D, 396.4° C. | D, 370.5° C. | D, 20 min |
| Comparative example 2 | A, 79.8° C. | C, 238.8° C. | D, 40 min |

A: no change B: smoke generation C: fire D: explosion

Referring to the above Table 3, in a battery having a separator coated with inorganic particles on both surfaces according to Comparative example 2, smoke generation did not result in a fire during the overcharge test and the thermal shock test, but during the nail penetration test, the separator undergone severe shrinkage due to sudden heat generation around the nail, causing an internal short circuit and consequently a fire, as a consequence, stability was not ensured.

On the contrary, in the case of Embodiment examples 2-1 and 2-2 coated with inorganic particles on one surface and high heat resistance polymer on the other surface, there was no change to an inorganic coating layer and a high heat resistance polymer coating layer during the nail penetration test no matter whether a cathode electrode or an anode electrode, and in particular, Embodiment example 2-1 using a composite separator interposed between a cathode electrode and an anode electrode with an inorganic coating layer disposed facing the cathode electrode and a high heat resistance polymer coating layer disposed facing the anode electrode has less cell temperature change than Embodiment example 2-2, but it is not a remarkable difference, and thus it is considered that a special limitation on safety is not needed.

Because there was no change in shape of Embodiment examples 2-1 and 2-2 even though internal temperature of the battery has increased during the overcharge test and the thermal shock test, there was no problem with safety.

High Temperature Storage Test

After the batteries of Embodiment example 2-1, Comparative example 1, and Comparative example 2 were stored in an oven of 45±2° C. for one month, thickness, remaining capacity and voltage of the battery were measured and their results are shown in Table 4. Also, voltage changes for one month measured by the test are shown in FIG. 6.

TABLE 4

| | Remaining capacity (%) | Voltage change (V) | Thickness change rate (%) |
|---|---|---|---|
| Embodiment example 2-1 | 90.56 | 0.090 | 3.7 |
| Comparative example 1 | 89.88 | 0.116 | 3.9 |
| Comparative example 2 | 84.25 | 0.165 | 11.4 |

A battery with a separator coated with inorganic particles on both surfaces according to Comparative example 2 has exhibited a phenomenon in which the battery swells due to gas generation caused by a side reaction between the inorganic particles and an electrolyte solution at high temperature, and as a consequence, a phenomenon in which cell thickness greatly increases and voltage drastically reduces.

In contrast, in the case of Embodiment example 2-1 having a composite separator coated with inorganic particles on one surface and high heat resistance polymer on the other surface, it is found that a cell thickness change is lower about triple than Comparative example 2 and shows excellent voltage retention characteristics.

What is claimed is:

1. A lithium secondary battery comprising: a cathode, an anode, and a separator interposed between the cathode and the anode, wherein the separator is a high heat resistance composite separator comprising:

a porous substrate having a plurality of pores;

an inorganic coating layer formed on one surface of the porous substrate, the inorganic coating layer consisting of a plurality of inorganic particles and a binder polymer disposed on a portion or all of surfaces of the inorganic particles to connect and bind the inorganic particles; and a high heat resistance polymer coating layer formed on the other surface of the porous substrate, the high heat resistance polymer coating layer consisting of a high heat resistance polymer and inorganic particles dispersed in the high heat resistance polymer, wherein the inorganic coating layer consists of the binder polymer in a range of 0.1 to 50 parts by weight based on 100 parts by weight of the inorganic particles, wherein the high heat resistance polymer coating layer consists of the inorganic particles in a range of 1 to 30 parts by weight based on 100 parts by weight of the high heat resistance polymer, wherein the binder polymer is any one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or mixtures thereof, wherein the high heat resistance polymer is any one selected from the group consisting of aromatic polyamide, aromatic polyimine, polytetrafluoroethylene), polybenzoxazole, polybenzimidazole, polyphenylsulfideandpolyphenyleneoxide, or mixtures thereof, and wherein the inorganic coating layer is disposed facing the cathode electrode, and the high heat resistance polymer coating layer is disposed facing the anode electrode.

2. The lithium secondary battery according to claim 1, wherein the porous substrate is a polyolefin-based porous membrane or non-woven fabric.

3. The lithium secondary battery according to claim 1, wherein the porous substrate is formed from any one selected from the group consisting of polyethylene, polypropylene, polybutylene, polypentene, polymethylpentene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene and their copolymers, or mixtures thereof.

4. The lithium secondary battery according to claim 1, wherein the inorganic particles are selected from the group consisting of inorganic particles having a dielectric constant greater than or equal to 5, inorganic particles capable of transporting lithium ions, and mixtures thereof.

5. The lithium secondary battery according to claim 4, wherein the inorganic particles having the dielectric constant greater than or equal to 5 are any one selected from the group consisting of $BaTiO_3$, $Pb(Zr_x,Ti_{1-x})O_3$ (PZT, $0<x<1$), $Pb_{1-x}La_xZr_{1-y}Ti_yO_3$(PLZT, $0<x<1$, $0<y<1$), $(1-x)Pb(Mg_{1/3}Nb_{2/3})O_3$-$xPbTiO_3$(PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or mixtures thereof.

6. The lithium secondary battery according to claim 4, wherein the inorganic particles capable of transporting lithium ions are any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAl-TiP)$_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ based glass ($Li_xSi_yS_z$, $0<x<3$, $0<y<2$, $0<z<4$) and $P_2S_5$ based glass ($Li_xP_yS_z$, $0<x<3$, $0<y<3$, $0<z<7$), or mixtures thereof.

7. The lithium secondary battery according to claim 1, wherein the aromatic polyamide is para-type aromatic polyamide, meta-type aromatic polyamide, and their mixture.

8. The lithium secondary battery according to claim 1, wherein the separator has porosity in a range of 30 to 70% and air permeability in a range of 150 to 400 sec/100 ml.

\* \* \* \* \*